(12) United States Patent
Klein-Hitpass et al.

(10) Patent No.: US 8,621,940 B2
(45) Date of Patent: Jan. 7, 2014

(54) METHOD FOR DETECTING TORQUE IN A TRANSMISSION, MEASURING DEVICE AND CONTROL PROGRAM

(75) Inventors: Arno Klein-Hitpass, Aachen (DE); Jan-Dirk Reimers, Aachen (DE)

(73) Assignee: Siemens Aktiengesellschaft, München (DE)

( * ) Notice: Subject to any disclaimer, the term of this patent is extended or adjusted under 35 U.S.C. 154(b) by 248 days.

(21) Appl. No.: 13/051,442

(22) Filed: Mar. 18, 2011

(65) Prior Publication Data

US 2012/0067138 A1 Mar. 22, 2012

(51) Int. Cl.
 *G01L 3/02* (2006.01)
(52) U.S. Cl.
 USPC .................. 73/862.326; 73/862.328
(58) Field of Classification Search
 USPC ............ 73/862.08, 862.31, 862.326, 862.328
 See application file for complete search history.

(56) References Cited

U.S. PATENT DOCUMENTS

| | | |
|---|---|---|
| 4,136,559 A | 1/1979 | Brown |
| 4,872,337 A | 10/1989 | Watts et al. |
| 4,931,949 A | 6/1990 | Hernandez et al. |
| 5,719,461 A * | 2/1998 | Peclat et al. ............. 310/323.02 |
| 6,578,437 B1 | 6/2003 | Moerbe |
| 7,617,727 B2 * | 11/2009 | Watson ...................... 73/504.13 |
| 2005/0274181 A1* | 12/2005 | Kutsuna et al. ............ 73/504.12 |
| 2007/0256495 A1* | 11/2007 | Watson ...................... 73/504.12 |

FOREIGN PATENT DOCUMENTS

| | | |
|---|---|---|
| DE | 2815463 A1 | 11/1978 |
| DE | 19732124 A1 | 2/1999 |
| DE | 19745823 | 4/1999 |
| WO | WO 0008434 A1 | 2/2000 |
| WO | WO 2005012763 A1 | 2/2005 |

* cited by examiner

*Primary Examiner* — Max Noori
(74) *Attorney, Agent, or Firm* — Henry M. Feiereisen LLC

(57) ABSTRACT

Torque can be detected in a transmission by using at least one vibration sensor to detect at least one vibration signal which is associated with a tooth engagement frequency of intermeshing transmission toothings, and the phase shift of which is dependent on at least one tooth engagement duration of the intermeshing transmission toothings. The tooth engagement duration is torque-dependent as a result of toothing deformations. A torque acting on the transmission is determined from the phase shift of the detected vibration signal and/or of the at least one tooth engagement duration.

12 Claims, 3 Drawing Sheets

METHOD FOR DETECTING TORQUE IN A TRANSMISSION, MEASURING DEVICE AND CONTROL PROGRAM

CROSS-REFERENCES TO RELATED APPLICATIONS

This application claims the priority of European Patent Application, Serial No. EP 10002921, filed Mar. 19, 2010, pursuant to 35 U.S.C. 119(a)-(d), the content of which is incorporated herein by reference in its entirety as if fully set forth herein.

BACKGROUND OF THE INVENTION

The present invention relates to the field of detecting torque in a transmission.

The following discussion of related art is provided to assist the reader in understanding the advantages of the invention, and is not to be construed as an admission that this related art is prior art to this invention.

In industrial processing and manufacturing processes, a wide range of complex demands is imposed on drive systems comprising transmissions, for example reliable operation for a prolonged period of use with minimal outlay on maintenance. Drive system failures which impair industrial processing and manufacturing processes may result in high financial damage, for example due to plant downtimes.

In particular in wind power plants, transmissions are subject during the period of use thereof to a dynamic load sequence of torques and bending moments and also axial and radial forces. In order to configure transmissions, use is made of load collectives defined by plant operators or manufacturers. Problems may arise if said load collectives do not correspond to the actual loads occurring during operation. In order to identify and to avoid overload situations, torque sensors can be provided in a transmission.

A torque measurement at a shaft is frequently based on the fact that a shaft has torsion spring properties and experiences rotation because of the effect of torque. Said rotation can be determined, for example, by means of strain gauges, optical sensors or magneto-elastic sensors. If the torsional rigidity of the shaft is known, the rotation determined can be used to derive the torque acting on the shaft.

It would be desirable and advantageous to provide an improved method for torque detection to obviate prior art shortcomings and to allow implementation in a simple manner in a transmission while permitting contact-free measurement which is reliable over the long term and is insensitive to malfunctions.

SUMMARY OF THE INVENTION

According to one aspect of the present invention, a method for determining a torque in a transmission, with the steps of detecting with at least one vibration sensor at least one vibration signal associated with a tooth engagement frequency of intermeshing transmission toothings, determining a phase shift of the at least one vibration signal, said phase shift depending on at least one tooth engagement duration, and determining a torque value acting on the transmission from the phase shift or the at least one tooth engagement duration, or both.

In accordance with the invention, torque is detected in a transmission, using at least one vibration sensor to detect at least one vibration signal which is associated with a tooth engagement frequency of intermeshing transmission toothings, and the phase shift of which is dependent on at least one tooth engagement duration of the intermeshing transmission toothings. In this case, the tooth engagement duration is torque-dependent as a result of toothing deformations. A torque acting on the transmission is determined from the phase shift of the detected vibration signal and/or of the at least one tooth engagement duration.

The present invention permits, for example, use of vibration sensors, which were hitherto used for transmission state monitoring systems or condition monitoring systems, additionally for detecting torque. In contrast to previous contact-free torque measurement systems which are arranged about a transmission shaft and take up space there, a measuring device according to the invention can be integrated more easily into transmissions.

In order to detect torque, a torque-dependent difference between phase shifts of tooth engagement frequencies of at least two different tooth engagements can also be determined. The torque acting on the transmission is then determined from the difference between the phase shifts. As an alternative thereto, a plurality of vibration signals or vibration signal components which are associated with a plurality of different tooth engagements can be detected. In this case, the torque acting on the transmission is determined with reference to an average value calculated for a plurality of different tooth engagements. In this case, the tooth engagements of the transmission can be monitored for deviations between the average value and measured torque values individual to the tooth engagement. If a deviation exceeds a specifiable threshold value, an alarm signal comprising an indication of an affected tooth engagement can be generated, for example.

According to another aspect of the present invention, a measuring device for determining a torque acting on a transmission includes at least one vibration sensor for measuring at least one vibration signal associated with a tooth engagement frequency of intermeshing transmission toothings, wherein the intermeshing transmission toothings define a phase shift of the at least one vibration signal which depends on at least one torque-dependent tooth engagement duration, and a signal processing unit operatively connected to the at least one vibration sensor for determining the torque acting on the transmission from the phase shift of the at least one vibration signal or the at least one torque-dependent tooth engagement duration.

According to yet another aspect of the present invention, a control program for detecting torque in a transmission is stored on a non-transitory computer-readable medium and has at least one code section which, when loaded into a memory of a data processing device and executed in the data processing device, causes the data processing device to detect with at least one vibration sensor at least one vibration signal associated with a tooth engagement frequency of intermeshing transmission toothings, determine a phase shift of the at least one vibration signal, wherein the phase shift depends on at least one tooth engagement duration, and determine a torque value acting on the transmission from the phase shift or the at least one tooth engagement duration, or both.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
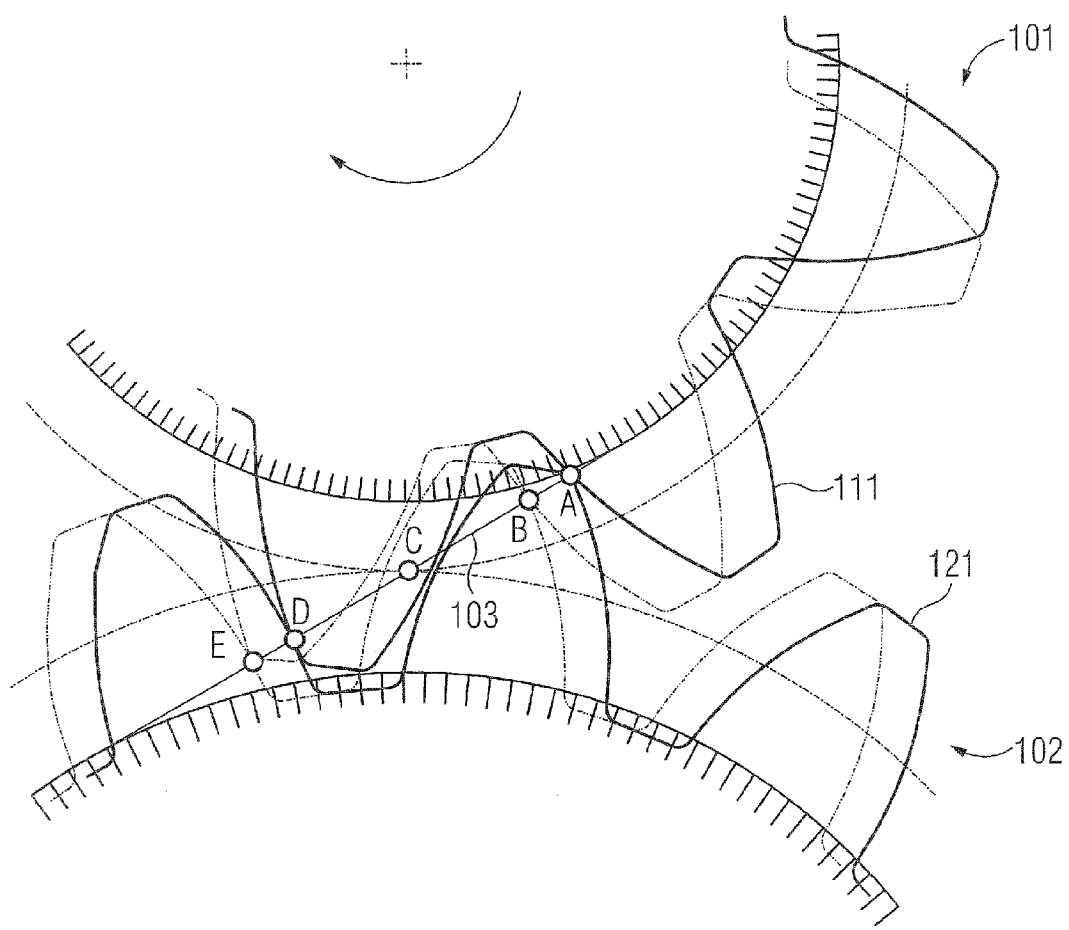
FIG. 1 shows an illustration by way of example of a tooth engagement of a cylindrical gear pair having involute toothing.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown, by way of example, a tooth engagement of a cylindrical gear pair having involute toothing. Two gearwheels 101, 102 of the cylindrical gear pair are illustrated there in a first position (continuous line) at a time T1 at which a tooth 111 of a first gearwheel 101 intermeshes at an engagement point A with a tooth 121 of a second gearwheel 102. In addition, the two gearwheels 101, 102 are illustrated in a second position (dashed line) at a second time T2 at which the engagement between the tooth 111 of the first gearwheel 101 and the tooth 121 of the second gearwheel 102 ends at an engagement point E when both gearwheels 101, 102 are rotated in the sketched direction. Only the two teeth 111, 121 of the gearwheels 101, 102 intermesh in an individual engagement area between an engagement point B and an engagement point D. By contrast, further teeth of the gearwheels 101, 102 are also connected to one another in double engagement areas between the engagement points A and B and between the engagement points D and E. At an engagement point C, which is also referred to as a rolling contact point, the gearwheels 101, 102 roll along each other in a manner free from sliding friction. The engagement points A-E lie on a straight line 103 in the case of an involute toothing.

Intermeshing teeth of a pair of gearwheels deform under the load, and therefore teeth which follow in the direction of rotation intermesh earlier, considered relatively. This gives rise to varying tooth engagement durations and tooth force fluctuations which in turn result in noises and vibrations. Said noises and vibrations can be detected as a vibration signal by means of a vibration sensor. In this case, the vibration signal is representative of a tooth engagement frequency of the pair of gearwheels, the gearwheels of which intermesh. The vibration signal has a phase shift which is dependent on at least one tooth engagement duration of the intermeshing gearwheels.

Figure 2:
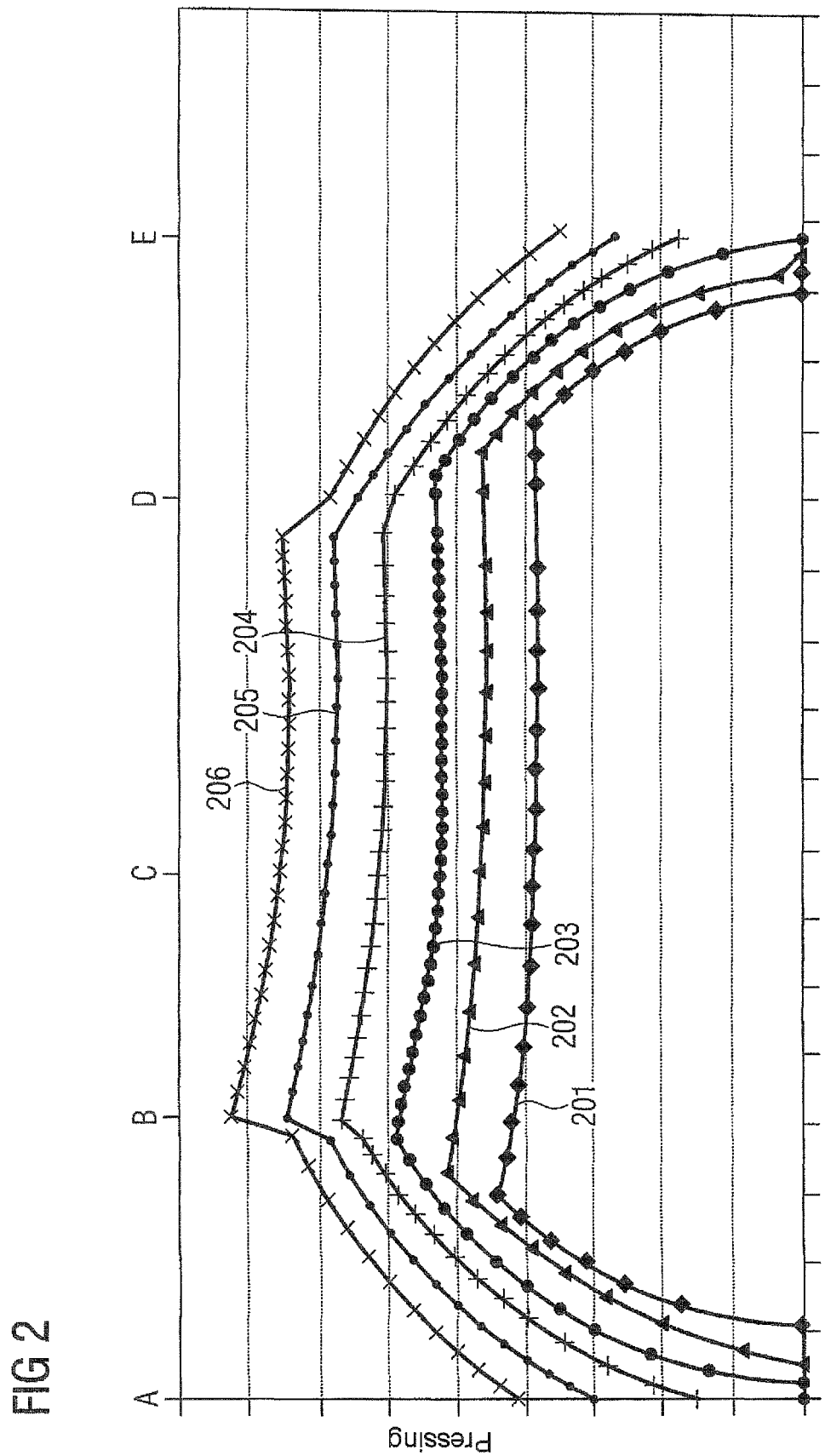
FIG. 2 shows a diagram produced for a plurality of different torque loads with tooth profile pressing gradients along a tooth engagement section.

In the case of spur-toothed gearwheels, deformations substantially determined by the tooth rigidity and acting torque arise under load. These result in a tooth engagement phase shift which increases as the torque increases. This is basically also applicable to gearwheels having helical toothing. Corresponding to the diagram produced in FIG. 2 for a plurality of different torque loads and having tooth profile pressing gradients 201-206, the tooth engagement duration increases continuously along a tooth engagement section between the engagement points A and E as the torque increases. The gradient 201 is associated with the lowest torque load while the gradient 206 is associated with the highest torque load. The torque load increases continuously from the gradient 201 to the gradient 206. In addition, it is apparent with reference to the tooth profile pressing that the tooth engagement duration along a tooth engagement section between the engagement points B and D decreases as the torque load increases. This load-dependent behavior can be detected, for example, by airborne sound vibration pickups or structure borne sound vibration pickups.

Figure 3:
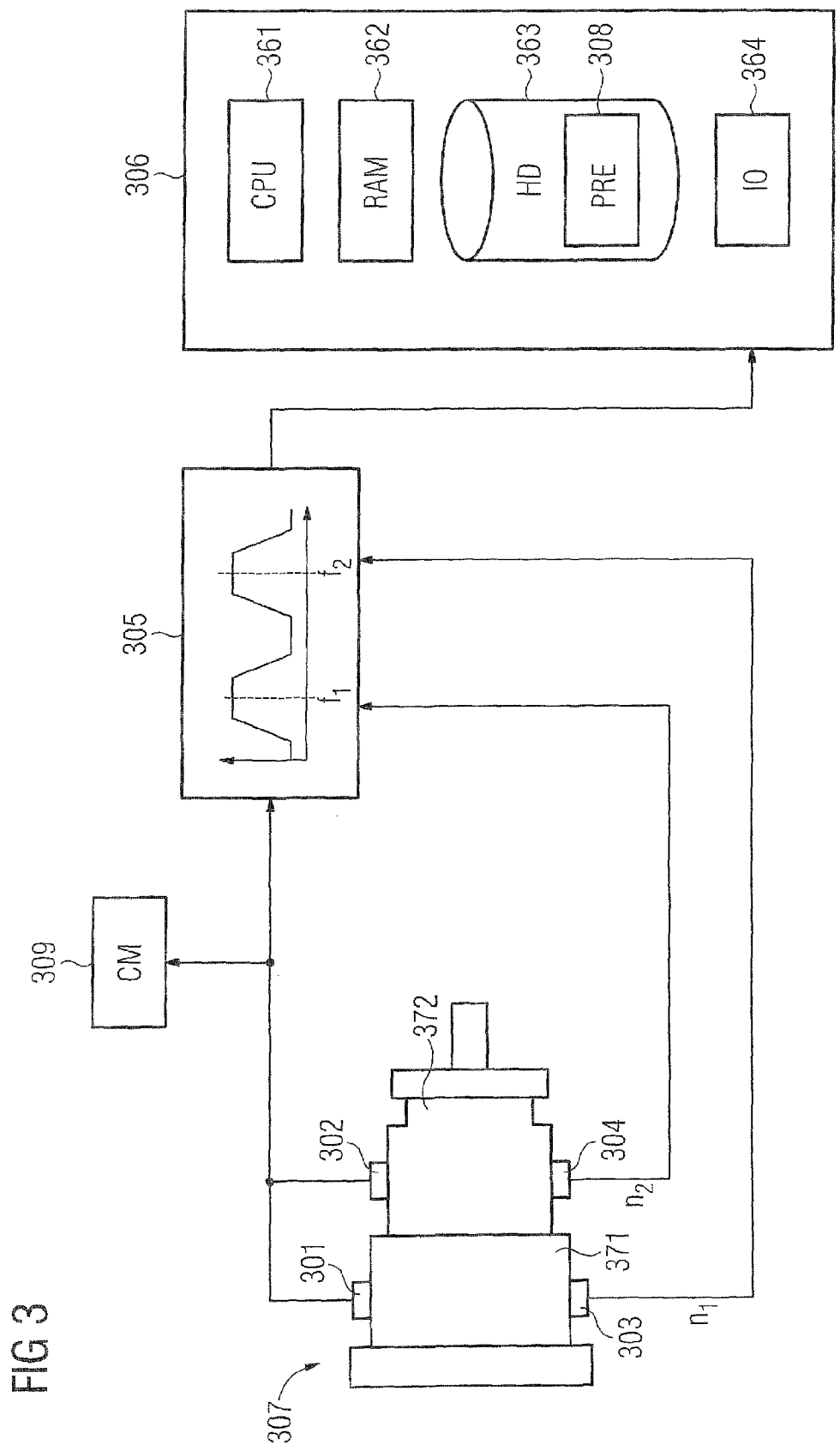
FIG. 3 shows a schematic illustration of an arrangement with a transmission and a torque measuring device.

The arrangement which is illustrated schematically in FIG. 3 comprises a torque measuring device with two vibration sensors 301, 302 mounted on a housing of a transmission 307 and with a computer-based signal processing unit 306. In principle, even a single vibration sensor is sufficient. In this case, a signal processing unit having greater computational power and being able to be executed, for example, even purely on a hardware basis, should be selected.

The two vibration sensors 301, 302 are used to detect vibration signals which each represent a tooth engagement frequency of intermeshing transmission toothings of a first transmission stage 371 and a second transmission stage 372. As explained above, the phase shifts of the tooth engagement frequencies are dependent on the tooth engagement durations of the intermeshing transmission toothings. The tooth engagement durations in turn are torque-dependent as a result of toothing deformations. The two vibration sensors 301, 302 are sensors of a condition monitoring system 309 for the transmission 307, which sensors are used for determining a vibration signature, and therefore, if a condition monitoring system is present, basically no new sensors are required in order to detect torque.

With two vibration sensors, use can additionally be made of the fact that a drive train between the intermeshing transmission toothings of the first transmission stage 371 and those of the second transmission stage 372 experiences torque-dependent rotations. Said rotations of the drive train lead to phase shifts between the vibration signals detected by the two vibration sensors 301, 302. The drive train between the transmission toothings under consideration frequently has a torsional spring rigidity which is substantially identical for all of the transmissions of a series and can be determined within the scope of a calibration operation, for example on a transmission test rig.

The signal processing unit 306 of the torque measuring device comprises a processor 361, a working memory 362, a nonvolatile memory 363—for example a hard disk drive or a flash memory—and an input/output unit 364. The signal processing unit 305 is coupled to the vibration sensors 301, 302 via a bandpass filter 305 assigned to said signal processing unit.

A control program 308 is stored in the memory 363 of the signal processing unit 306, which control program can be loaded into the working memory 362 and has code sections which can be processed by the processor 361 and upon the execution of which vibration signals are detected via the vibration sensors 301, 302. A torque acting on the transmission 307 is determined from the phase shifts of the detected vibration signals or from the detected tooth engagement durations by the control program 308 when the latter is running in the signal processing unit 306. For example, play caused by bearing slackness or tooth backlash in the drive train can be derived from a hysteresis-like gradient of the determined torque by the method implemented by the control program.

By means of the signal processing unit 306, the detected vibration signals can also be transformed from a frequency domain into a time domain, for example by means of inverse Laplace or Fourier transformation or by means of inverse Z transformation in the case of discrete signals. The tooth engagement durations between the engagement points B and D and between the engagement points A and E can then be determined from the vibration signals transformed into the time domain.

The vibration signals detected by means of the vibration sensors 301, 302 are pre-processed for the signal processing unit 306 by the bandpass filter 305 with respect to specifiable frequency ranges by basic tooth engagement frequencies of the transmission toothings under consideration. In the present exemplary embodiment, basic tooth engagement frequencies are determined by means of revolution counters 303, 304 assigned to the two transmission stages 371, 372.

The above-described method for detecting torque in a transmission can be expanded by forming an average value via a plurality of torque measuring signals. This enables individual geometry deviations in the transmission toothings to be placed against one another and toothing deviations or increased play to be detected. For this purpose, a plurality of vibration signals or vibration signal components associated with a plurality of different tooth engagements are detected. The torque acting on the transmission is then determined with reference to an average value calculated for a plurality of different tooth engagements. Tooth engagements of the transmission can then be monitored for deviations between the average value and measured torque values individual to the tooth engagement. If there is a deviation above a specifiable threshold value, an alarm signal comprising an indication of an affected tooth engagement is generated, for example.

The use of the present invention is not restricted to the exemplary embodiment described here.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining a torque in a transmission having a pair of gearwheels with intermeshing teeth that deform under load, comprising the steps of:
   detecting with at least one vibration sensor at least one vibration signal associated with a tooth engagement frequency of the intermeshing teeth of the gearwheels;
   determining a phase shift of the at least one vibration signal, said phase shift depending on the tooth engagement duration, wherein the at least one tooth engagement duration depends on a torque value in the transmission caused by deformation of the intermeshing teeth under the load; and
   determining the torque value acting on the transmission from the phase shift or the at least one tooth engagement duration, or both.

2. The method of claim 1, further comprising the steps of determining a torque-dependent difference between phase shifts of tooth engagement frequencies of at least two different tooth engagements, and determining the torque value acting on the transmission from the difference between the phase shifts.

3. The method of claim 1, further comprising the steps of detecting a plurality of vibration signals or vibration signal components which are associated with a plurality of different tooth engagements, and determining an average torque value acting on the transmission by averaging the plurality of vibration signals or vibration signal components.

4. The method of claim 3, further comprising the steps of monitoring differences between the average torque value and individual measured torque values, and generating an alarm signal when a deviation lies above a predetermined threshold value.

5. The method of claim 4, wherein the alarm signal comprises an indication of an affected tooth engagement.

6. The method of claim 1, further comprising the steps of
   transforming the at least one vibration signal from a frequency domain into a time domain, and
   determining from the vibration signal transformed into the time domain a tooth engagement duration between a time when a tooth of a first gearwheel first makes contact with a meshing tooth of a second gearwheel of the transmission and a time when the tooth of the first gearwheel last makes contact with the meshing tooth of the second gearwheel, or
   a tooth engagement duration between a time when in absence of contact between other teeth of the first and second gearwheel, the tooth of the first gearwheel makes exclusive contact with the meshing tooth of the second gearwheel of the transmission and a time when the tooth of the first gearwheel last makes exclusive contact with the meshing tooth of the second gearwheel,
   or both.

7. The method of claim 1, further comprising the step of band-pass-filtering the at least one vibration signal in a predetermined frequency range about a basic tooth engagement frequency.

8. The method of claim 7, wherein the basic tooth engagement frequency is determined by a revolution counter.

9. The method of claim 1, wherein the at least one vibration sensor is constructed as an airborne sound vibration pickup or a structure borne sound vibration pickup.

10. The method of claim 1, wherein the at least one vibration sensor constructed as sensor of a condition monitoring system employed for determining a vibration signature.

11. A measuring device for determining a torque acting on a transmission having a pair of gearwheels with intermeshing teeth that deform under load, said measuring device comprising:
    at least one vibration sensor for measuring at least one vibration signal associated with a tooth engagement frequency of the intermeshing teeth of the gearwheels, said at least one vibration signal defining a phase shift which depends on at least one torque-dependent tooth engagement duration; and
    a signal processing unit operatively connected to the at least one vibration sensor for determining the torque acting on the transmission from the phase shift of the at least one vibration signal or the at least one torque-dependent tooth engagement duration.

12. A control program for detecting torque in a transmission having a pair of gearwheels with intermeshing teeth that deform under load, said control program stored on a non-transitory computer-readable medium and having at least one code section which, when loaded into a memory of a data processing device and executed in the data processing device, causes the data processing device to:

detect with at least one vibration sensor at least one vibration signal associated with a tooth engagement frequency of the intermeshing teeth of the gearwheels;

determine a phase shift of the at least one vibration signal, said phase shift depending on at least one tooth engagement duration of the intermeshing teeth of the gearwheels, wherein the at least one tooth engagement duration depends on a torque in the transmission caused by deformation of the intermeshing teeth under the load; and determine a torque value acting on the transmission from the phase shift or the at least one tooth engagement duration, or both.

\* \* \* \* \*

UNITED STATES PATENT AND TRADEMARK OFFICE
CERTIFICATE OF CORRECTION

| | | |
|---|---|---|
| PATENT NO. | : 8,621,940 B2 | Page 1 of 1 |
| APPLICATION NO. | : 13/051442 | |
| DATED | : January 7, 2014 | |
| INVENTOR(S) | : Arrno Klein-Hitpass and Jan-Dirk Reimers | |

It is certified that error appears in the above-identified patent and that said Letters Patent is hereby corrected as shown below:

Title Page:
Add item (30) Foreign Application Priority Data as follows: --EP10002921; filed: March 19, 2010--

Signed and Sealed this
Fourth Day of March, 2014

Michelle K. Lee
*Deputy Director of the United States Patent and Trademark Office*